United States Patent
Ku et al.

(10) Patent No.: US 7,066,069 B2
(45) Date of Patent: Jun. 27, 2006

(54) TILT ANGLE DISPLAY DEVICE FOR A CIRCULAR SAW MACHINE

(75) Inventors: George Ku, Taichung Hsien (TW); Eric Lo, Taichung Hsien (TW)

(73) Assignee: Rexon Industrial Corp., Ltd. (TW)

( * ) Notice: Subject to any disclaimer, the term of this patent is extended or adjusted under 35 U.S.C. 154(b) by 67 days.

(21) Appl. No.: 10/795,222

(22) Filed: Mar. 9, 2004

(65) Prior Publication Data

US 2005/0199112 A1    Sep. 15, 2005

(51) Int. Cl.
*B23D 45/06*    (2006.01)
*B26D 7/26*    (2006.01)

(52) U.S. Cl. ............... 83/473; 83/477.2; 83/508.2; 83/522.18

(58) Field of Classification Search .......... 83/473, 83/477.2, 522.15, 522.16, 522.17, 522.18, 83/522.22, 522.23, 522.24, 508.2, 522.19
See application file for complete search history.

(56) References Cited

U.S. PATENT DOCUMENTS

| | | | | |
|---|---|---|---|---|
| 2,710,633 A | * | 6/1955 | Oberg | 83/435.14 |
| 2,750,970 A | * | 6/1956 | Gaskell | 83/477.2 X |
| 3,538,964 A | * | 11/1970 | Warrick et al. | 83/473 |
| 5,207,007 A | * | 5/1993 | Cucinotta et al. | 83/522.16 X |
| 5,735,054 A | * | 4/1998 | Cole | 83/477.2 X |
| 5,988,031 A | * | 11/1999 | Wixey | 83/473 X |
| 6,195,905 B1 | * | 3/2001 | Cole | 83/477.2 X |

* cited by examiner

*Primary Examiner*—Clark F. Dexter
(74) *Attorney, Agent, or Firm*—Bacon & Thomas PLLC

(57) ABSTRACT

A display device for a circular saw machine includes a flexible ruler whose two ends are connected to a frame fixed to the blade mechanism I the base of the circular saw machine. Two guide rollers are connected to an underside of the worktable and the flexible ruler reeved through the two guide rollers. A window is defined through the worktable of the machine and the flexible ruler goes beneath the window. The flexible ruler moves relative to the window when the blade mechanism is swung and the tilt angle of the blade mechanism can be observed through the window.

6 Claims, 8 Drawing Sheets

TILT ANGLE DISPLAY DEVICE FOR A CIRCULAR SAW MACHINE

FIELD OF THE INVENTION

The present invention relates to a tilt angle display device located on the top surface of the worktable such that the user conveniently observes the angle of the blade.

BACKGROUND OF THE INVENTION

A conventional circular saw machine 10 is disclosed in FIGS. 1 window. and 2a, and generally includes a base 11 with a worktable 12 on a top of the base 11. A blade mechanism 13 is received in the base 11 and the circular blade 14 of the mechanism 13 extends through a slot defined through the worktable 12. A tilt control device 15 includes a first wheel 151 and a rod 152, which is driven by the first wheel 151 which is located outside of the side wall 111 of the base 11. The mechanism 13 is engaged with a transmitting gear set 131 which is co-rotated with the rod 152. A height adjustment device 16 is connected to the mechanism 13 and includes a second wheel 161 which is located outside of the front wall 112 of the base 11. The second wheel 161 has a shaft 162 which movably extends through a curve slot 113 defined through the front wall 112 of the base 11 so that when the first wheel 151 is rotated, as shown in FIG. 2B, the mechanism 13 is tilted and the shaft 162 of the second wheel 161 moves along the curve slot 113. A plurality of angle marks 114 are located along the curve slot 113 and a pointer 163 connected to the shaft 162 moves with the movement of the shaft 162. The user may check the pointer 163 to know the tilt angle that the blade 14 tilts. It is noted that the user has to bend to check the pointer 163 which is located below the worktable 12. In other words, it takes several times to operate the first wheel 151 and check the pointer 163 to a desired position. Besides, the user has to put his or her eyes at proper position relative to the pointer 163 to obtain a correct data of the tilt angle.

The present invention intends to provide a tilt angle display device that is located on the worktable and beside the blade, such that the user can conveniently observe the tilt angle without frequently bending his body.

SUMMARY OF THE INVENTION

The present invention relates to a circular saw machine which comprises a base and a worktable connected to a top of the base. A blade mechanism is received in the base and includes a circular blade which extends through a slot through the worktable. A tilt control device is connected to the blade mechanism and able to tilt the blade mechanism. A display device is connected to a top surface of the worktable and displays a tilt angle of the circular blade.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
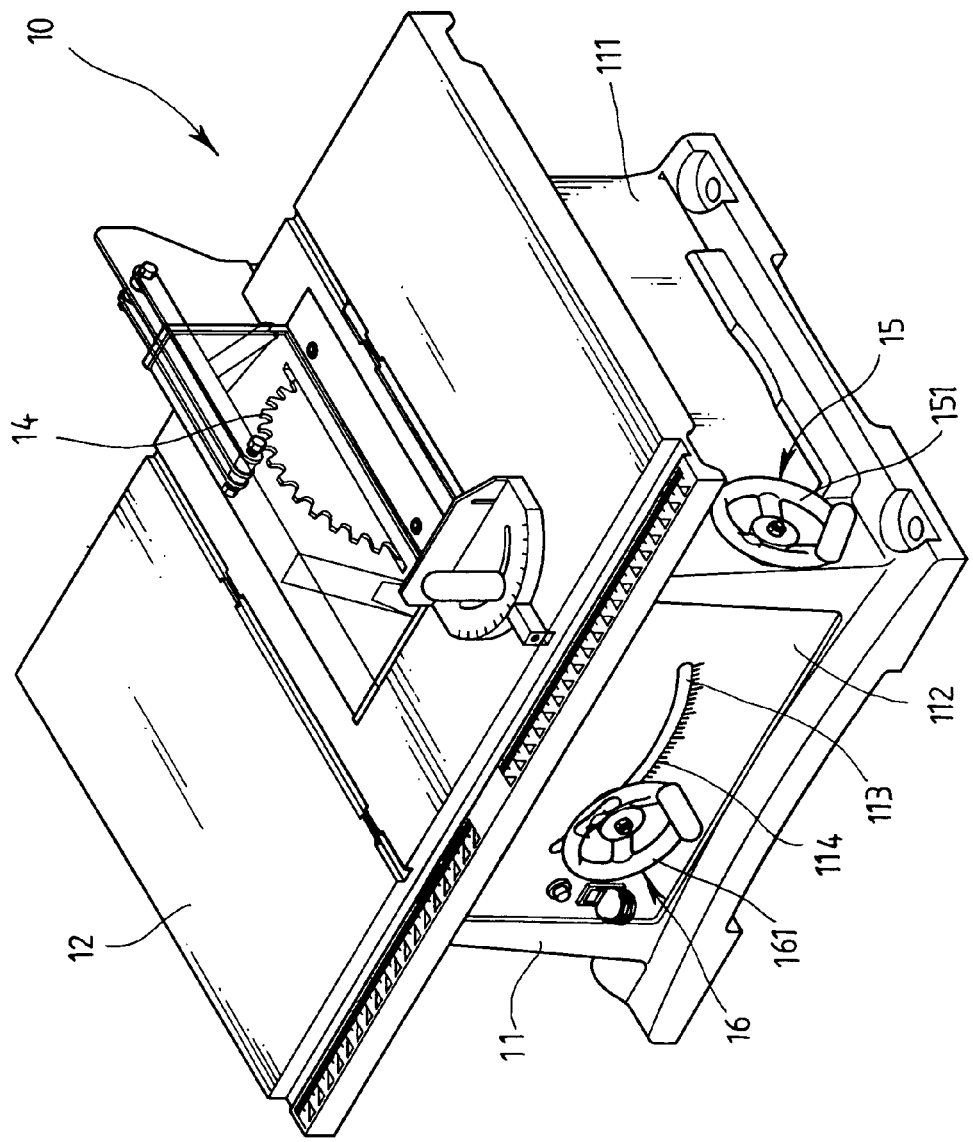
FIG. 1 is a perspective view of a conventional circular saw machine.
Figure 2A:
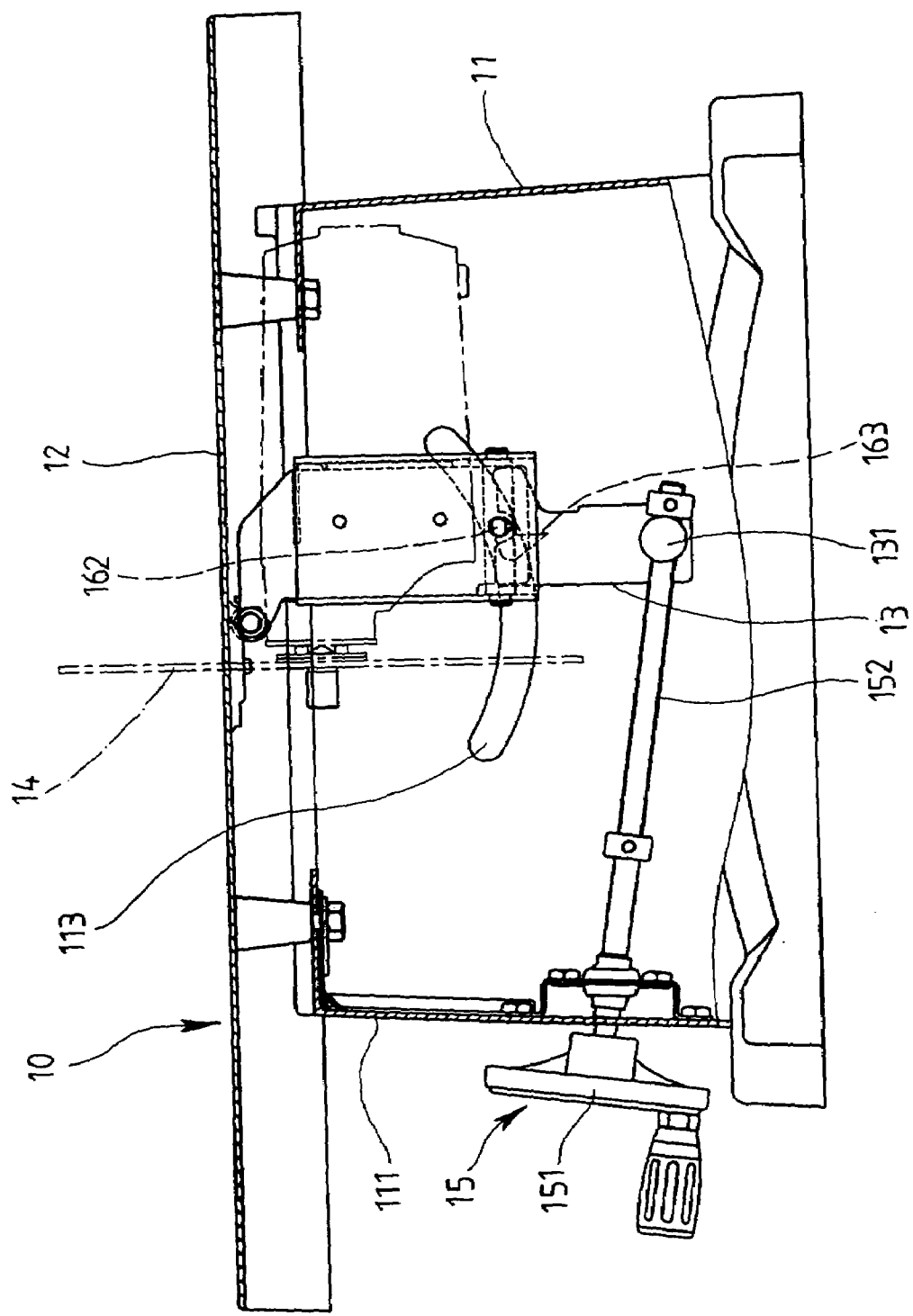
FIG. 2A is a side view to show the tilt control device connected to the circular blade mechanism of the conventional circular saw machine.
Figure 2B:
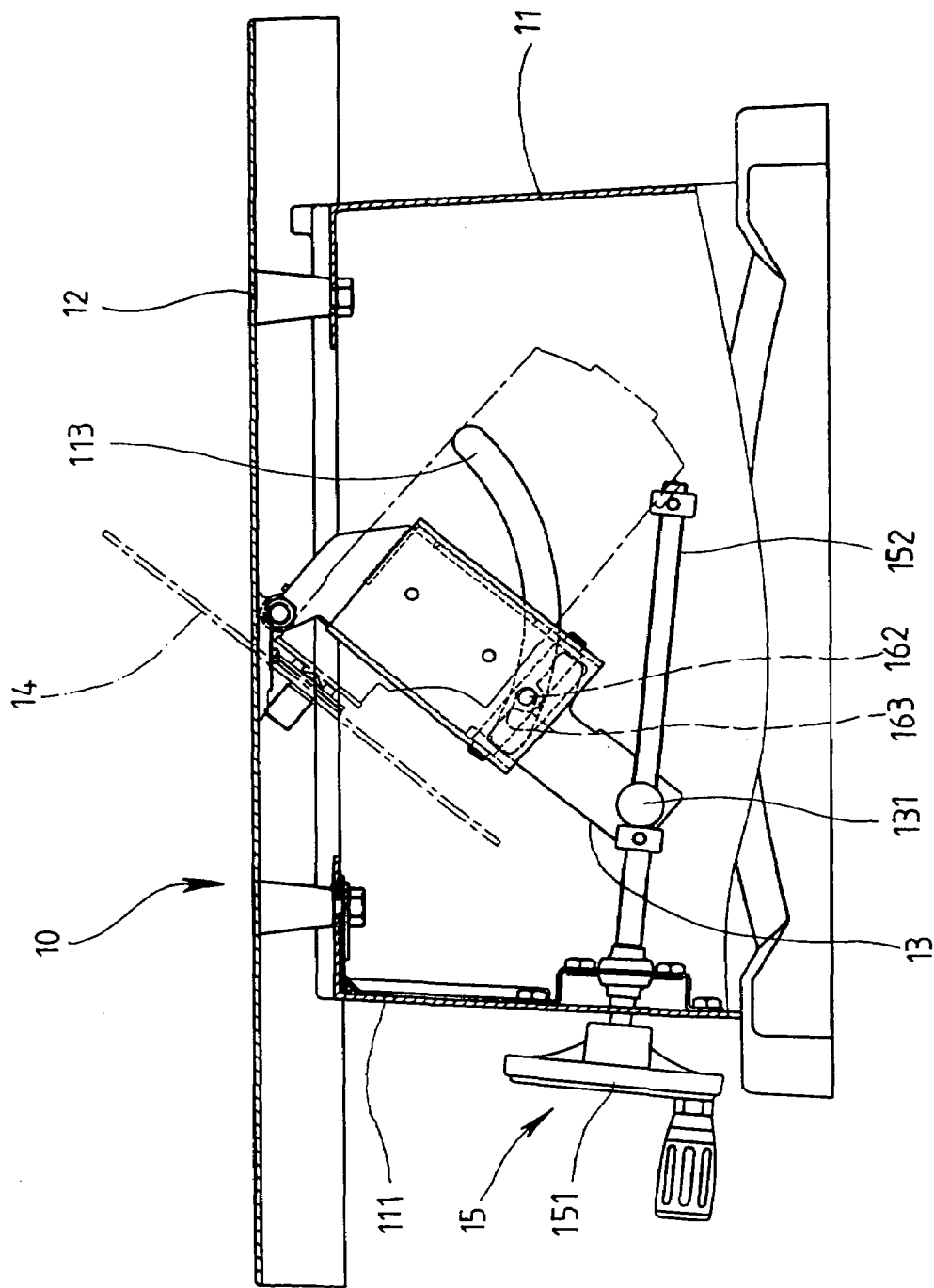
FIG. 2B shows the circular blade mechanism of the conventional circular saw machine is tilted when operating the tilt control device.
Figure 3:
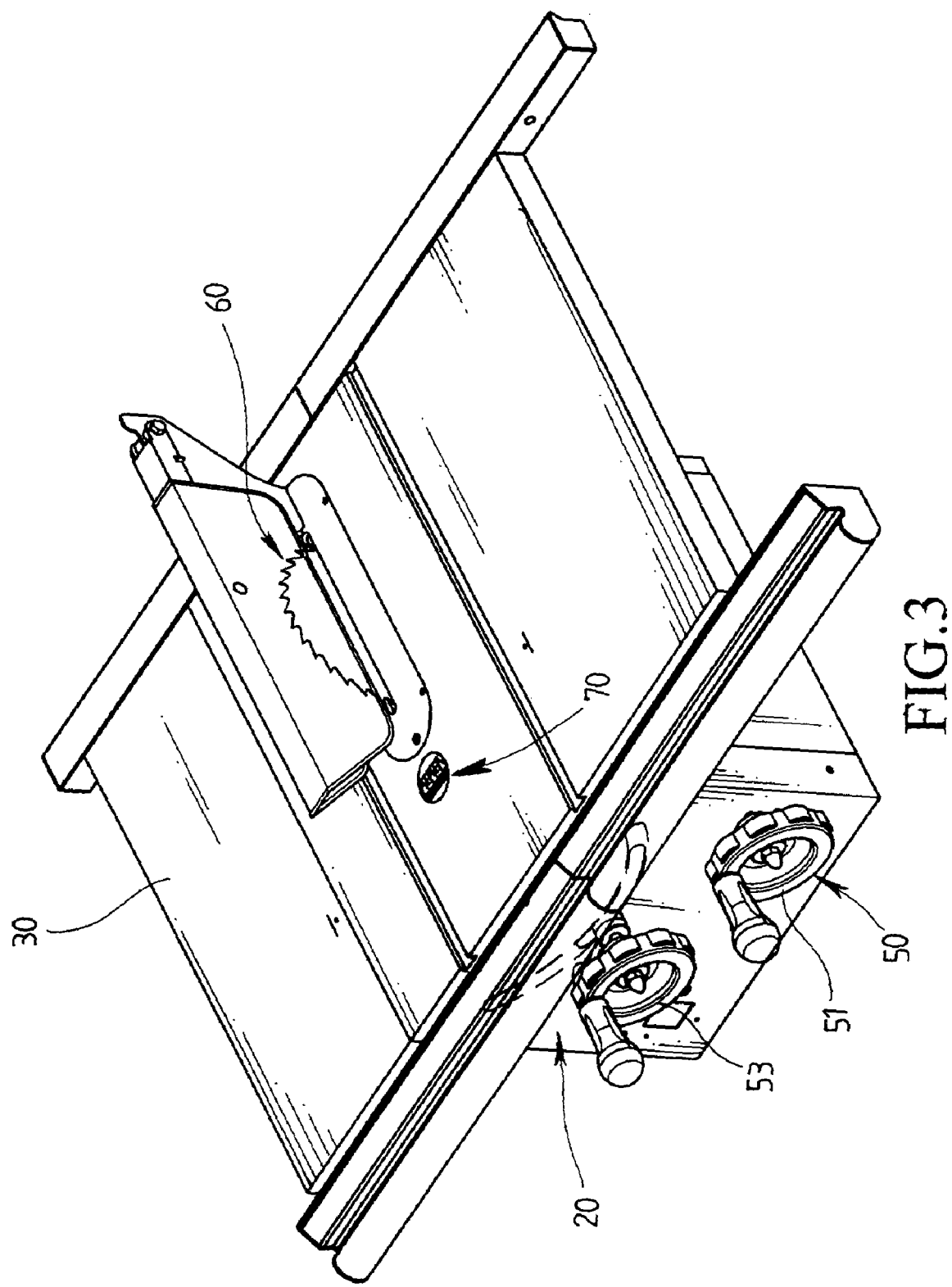
FIG. 3 is a perspective view of the circular saw machine of the present invention.
Figure 4:
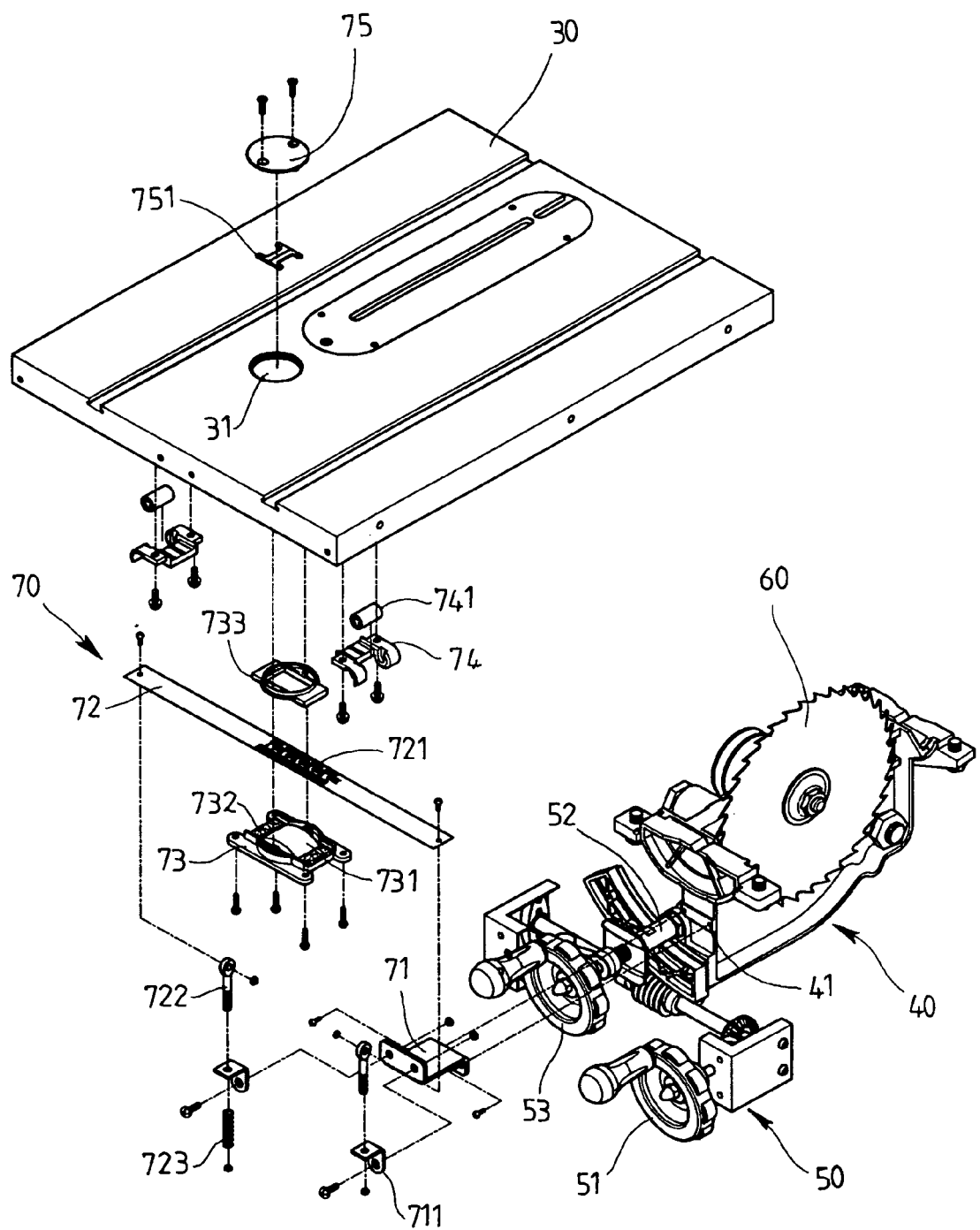
FIG. 4 is an exploded view to show the display device of the present invention.
Figure 5:
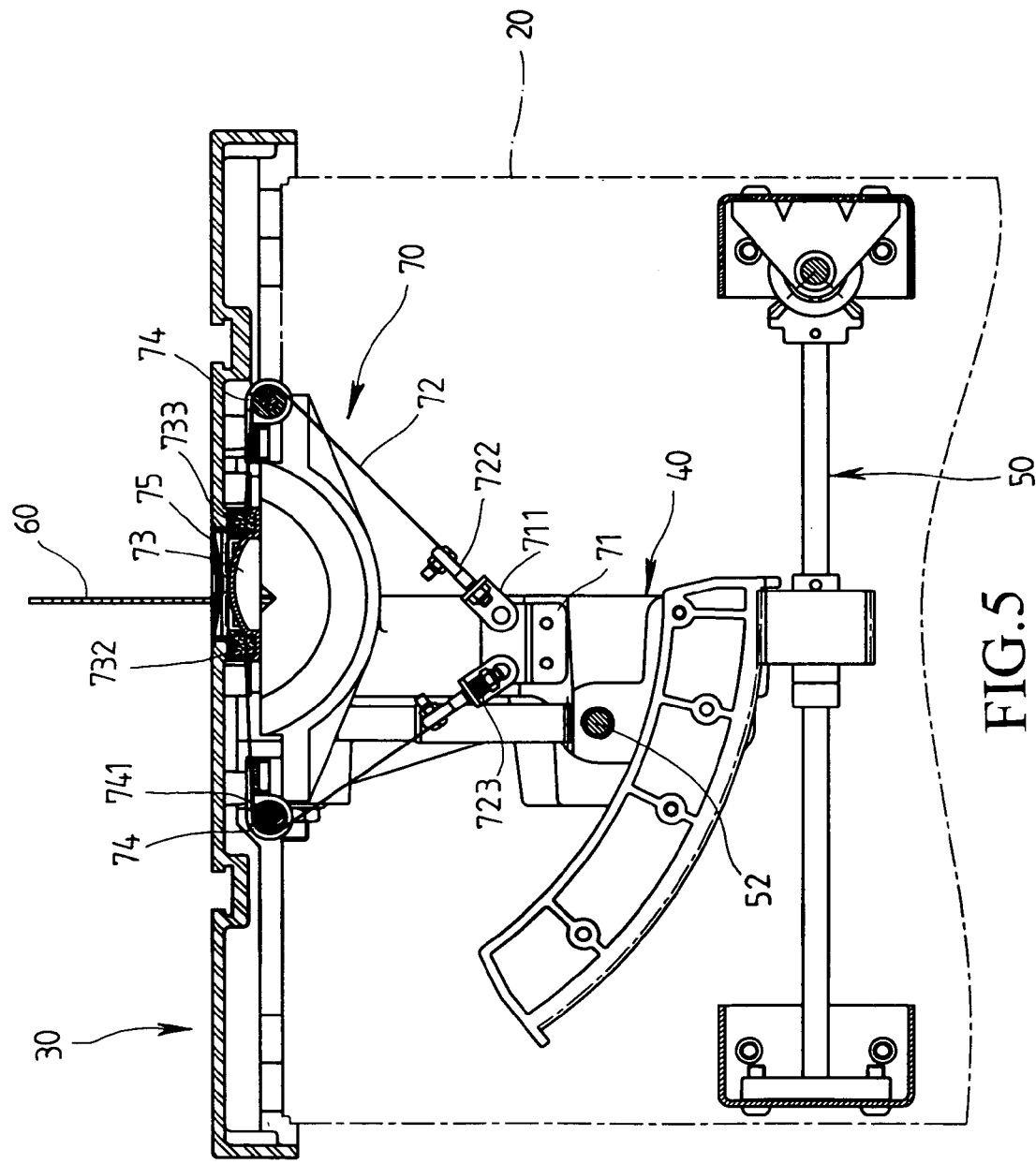
FIG. 5 is a side view to show the display device of the present invention.

Referring to FIGS. 3 to 5, the circular saw machine of the present invention comprises a base 20 and a worktable 30 is connected to a top of the base 20. A saw blade slot and a window 31 are respectively defined through the worktable 30. A blade mechanism 40 is received in the base 20 and includes a circular blade 60 which extends through the slot through the worktable 30.

A tilt control device 50 includes a rod and a worm gear which is mounted to the rod. The worm gear is engaged with the blade mechanism 40. A first wheel 51 is connected to the tilt control device 50 and drives the rod such that the blade mechanism 40 is pivoted by rotating the first wheel 51 which is located outside of the front wall of the base 20.

A height adjustment device includes a shaft 52 connected to the blade mechanism 40 and a second wheel 53 is connected to the shaft. The second wheel 53 is located outside of the front wall of the base 20 and beside the first wheel 51. The shaft 52 movably extends through a curve slot defined through the front wall of the base 20.

A display device 70 includes a frame 71 fixed to the blade mechanism 40 and two guide rollers 741 retained in two respective frames 74 are connected to an underside of the worktable 30. The window 31 is located between the two guide rollers 741. A flexible ruler 72 reeves through the two guide rollers 741 and two ends of the ruler 72 and are connected to the two end pieces 711. One of the bolts 722 has a spring 723 mounted thereto and biased between the end piece 711 and a head of the bolt 722. The spring 723 provides a force which maintains the tension of the ruler 72 and is advantageous to zero of the ruler 72. A plurality of angle marks 721 are marked on the ruler 72. The ruler 72 passes is visible through the window 31 50 that the user may see the angle marks via the window 31.

Figure 6:
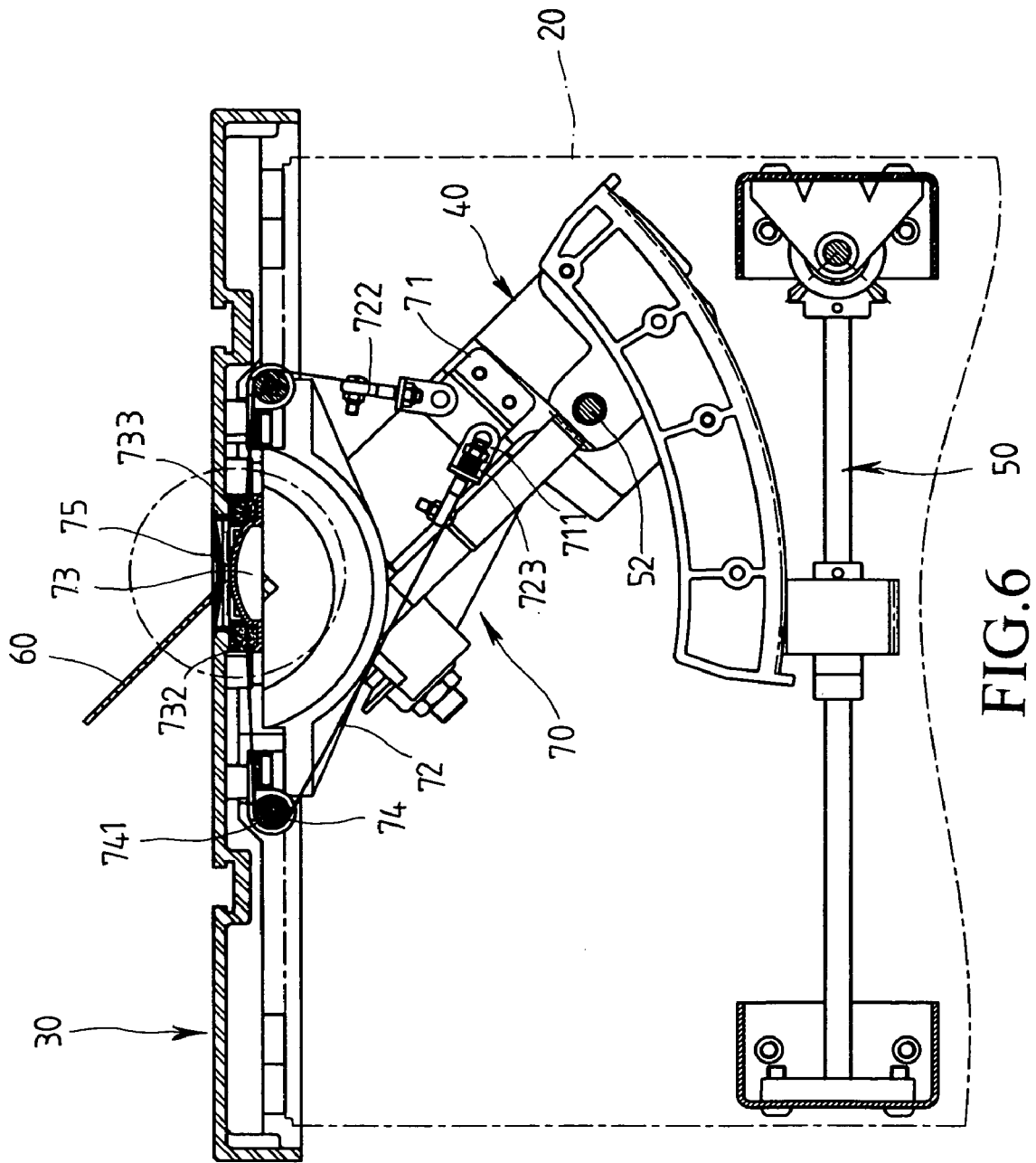
FIG. 6 shows that the ruler moves when the circular blade is pivoted.

As shown in FIG. 6, when rotating the first wheel 51, the worm gear drives the blade mechanism 40 to pivot an angle so that the circular blade 60 tilts above the top surface of the worktable 30. The two guide rollers 741 are connected to the worktable 30 so that the ruler 72 is pulled together with the pivotable movement of the blade mechanism 40. The user can see the angle marks 721 through the window 31 without bending his or her body. The display device of the present invention improves the shortcomings of the conventional display device.

Figure 7:
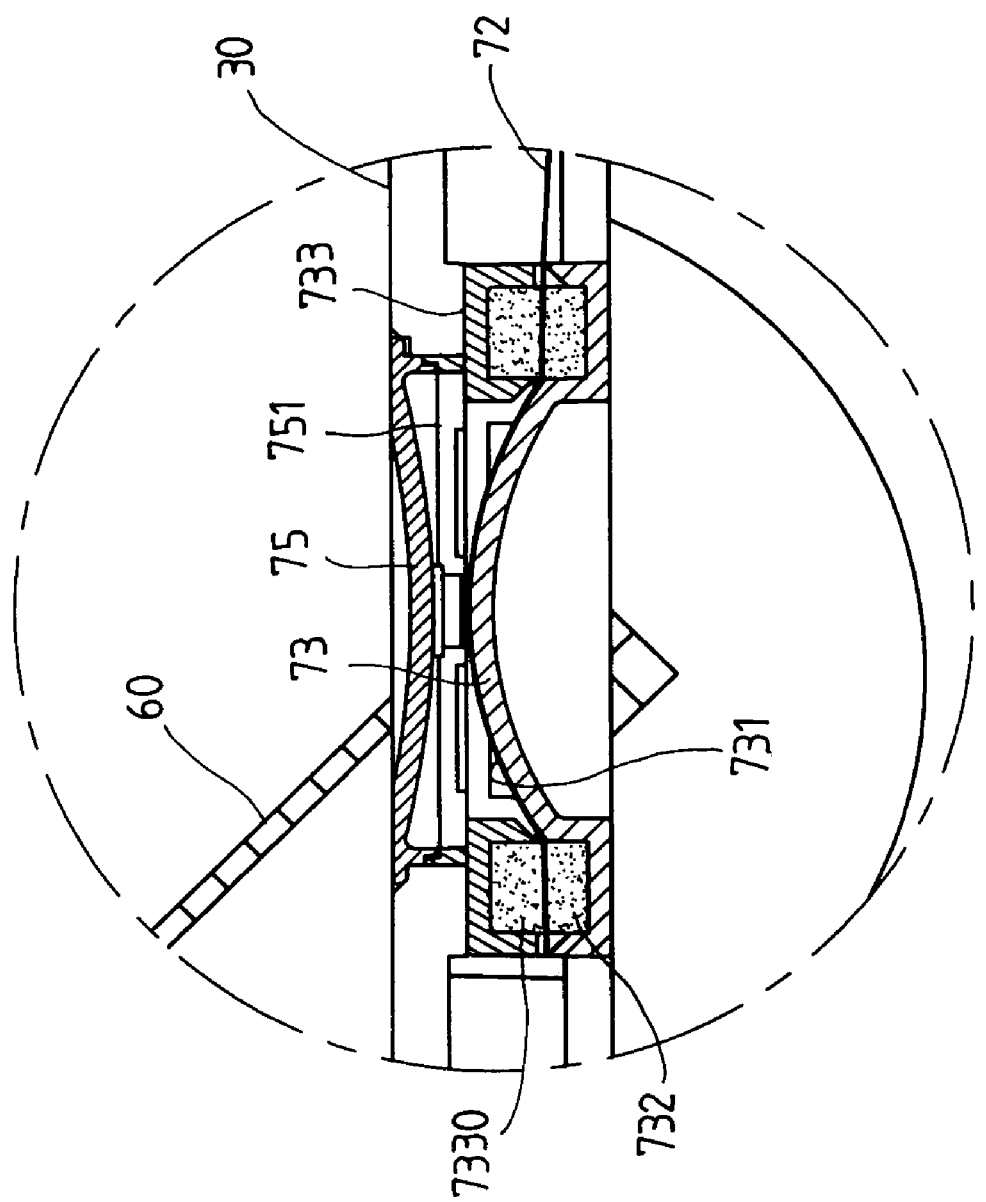
FIG. 7 shows an enlarged cross sectional view to show the ruler movably located between the lens and the support member.

Further referring to FIG. 7, a support member 73 is connected to an underside of the worktable 30 and has a curved and convex surface 731 which is located in the window 31 in the worktable 30. The convex surface 731 supports an underside of the ruler 72. The support member 73 includes two brush members 732 located in separate with each other and a mounting member 733 is mounted to the support member 73. Two brush members 7330 are located on an underside of the mounting member 733 and match with the two brush members 732. The flexible ruler 72 passes between the brush members 732 of the support member 73 and the brush members 7330 of the mounting member 733. The brush members 732 wipe the debris resulted from cutting by the circular blade 60 and the debris may cover the angle marks 721.

A lens 75 is engaged with the window 31 and a pointer 751 is located between the ruler 72 and the lens 75. Therefore, the angle marks 721 of the ruler 72 can be clearly seen via the lens 75.

While we have shown and described the embodiment in accordance with the present invention, it should be clear to those skilled in the art that further embodiments may be made without departing from the scope of the present invention.

What is claimed is:

1. A circular saw machine comprising:
   a base, a worktable connected to a top of the base, and a slot and a window respectively defined through the worktable;
   a blade mechanism received in the base and including a circular blade which extends through the slot;
   a tilt control device for tilting the blade mechanism, and
   a display device comprising a frame fixed to the blade mechanism, two guide rollers connected to an underside of the worktable, the window being located between the two guide rollers, a flexible ruler reeving through the two guide rollers and two ends of the ruler pivotably connected to the frame, the ruler being visible through the window to display a tilt angle of the circular blade.

2. The circular saw machine as claimed in claim 1 wherein a support member is connected to an underside of the worktable and has a convex surface which is located under the window in the worktable, the convex surface supporting an underside of the ruler.

3. The circular saw machine as claimed in claim 2 wherein the support member includes a first pair of brush members located apart from each other and a mounting member is mounted to the support member, a second pair of brush members being located on an underside of the mounting member, the flexible ruler passing between the brush members of the support member and the brush members of the mounting member.

4. The circular saw machine as claimed in claim 1 wherein two end pieces are pivotally connected to the frame and the two ends of the flexible ruler are respectively connected to the two end pieces.

5. The circular saw machine as claimed in claim 4, wherein two bolts respectively extend through two apertures in the two ends of the ruler and are connected to the two end pieces, at least one of the bolts has a spring mounted thereto, the spring being biased between the end piece and a head of the bolt.

6. The circular saw machine as claimed in claim 1 further comprising a lens engaged with the widow and a pointer located between the ruler and the lens.

\* \* \* \* \*